US009544852B2

(12) United States Patent
Park et al.

(10) Patent No.: US 9,544,852 B2
(45) Date of Patent: Jan. 10, 2017

(54) METHOD AND APPARATUS OF TRANSMITTING PAGING FRAME AND WAKEUP FRAME

(75) Inventors: Jong Hyun Park, Anyang-si (KR); Eun Sun Kim, Anyang-si (KR); Yong Ho Seok, Anyang-si (KR)

(73) Assignee: LG Electronics Inc., Seoul (KR)

(*) Notice: Subject to any disclaimer, the term of this patent is extended or adjusted under 35 U.S.C. 154(b) by 54 days.

(21) Appl. No.: 14/239,671

(22) PCT Filed: Jul. 31, 2012

(86) PCT No.: PCT/KR2012/006092
§ 371 (c)(1),
(2), (4) Date: Feb. 19, 2014

(87) PCT Pub. No.: WO2013/032139
PCT Pub. Date: Mar. 7, 2013

(65) Prior Publication Data
US 2014/0204822 A1    Jul. 24, 2014

Related U.S. Application Data

(60) Provisional application No. 61/528,152, filed on Aug. 27, 2011.

(51) Int. Cl.
*H04W 52/02* (2009.01)
*H04W 68/02* (2009.01)

(52) U.S. Cl.
CPC ..... *H04W 52/0235* (2013.01); *H04W 52/0216* (2013.01); *H04W 68/025* (2013.01); *Y02B 60/50* (2013.01)

(58) Field of Classification Search
None
See application file for complete search history.

(56) References Cited

U.S. PATENT DOCUMENTS 8,023,530 B1 * 9/2011 Giallorenzi ....... H04W 52/0222
370/252
8,358,613 B1 * 1/2013 Giallorenzi ........... H04W 12/02
370/328

(Continued)

FOREIGN PATENT DOCUMENTS

JP       2010-130096 A     6/2010
JP       2011109252 A      6/2011

(Continued)

*Primary Examiner* — Wei Zhao
*Assistant Examiner* — Ronald H Davis
(74) *Attorney, Agent, or Firm* — Dentons US LLP

(57) ABSTRACT

This document discloses a method and an apparatus for transmitting a paging frame and wakeup frame. The An AP comprises a transceiver receiving a paging frame from an STA; and a processor generating a wakeup frame for informing of existence of buffered data to be transmitted to the STA in response to the paging frame, where the paging frame includes a PLCP (Physical Layer Convergence Protocol) header and the PCLP header includes a waiting time field indicating a waiting time during which an STA is operated in the active mode to receive the wakeup frame; and the wakeup frame includes a PLCP header and the PLCP header includes a wakeup indication indicating the wakeup frame and a wakeup STA identification having information specifying the STA. Therefore, an STA can reduce power consumption wasted in the active mode.

9 Claims, 11 Drawing Sheets

(56) References Cited

U.S. PATENT DOCUMENTS

| | | | |
|---|---|---|---|
| 8,717,957 B2* | 5/2014 | Kim et al. | 370/311 |
| 2005/0025080 A1 | 2/2005 | Liu | |
| 2006/0092888 A1* | 5/2006 | Jeong et al. | 370/338 |
| 2007/0008915 A1* | 1/2007 | Kim | H04W 52/0216 370/311 |
| 2007/0171933 A1* | 7/2007 | Sammour | H04W 74/0816 370/447 |
| 2007/0230423 A1* | 10/2007 | Yoshida et al. | 370/338 |
| 2008/0186890 A1 | 8/2008 | Shao et al. | |
| 2010/0208618 A1 | 8/2010 | Kim et al. | |
| 2011/0032875 A1* | 2/2011 | Erceg et al. | 370/328 |
| 2011/0194475 A1 | 8/2011 | Kim et al. | |
| 2012/0182980 A1* | 7/2012 | Abraham et al. | 370/338 |
| 2012/0257536 A1* | 10/2012 | Kholaif et al. | 370/254 |
| 2013/0003629 A1* | 1/2013 | Jeong | H04W 52/0216 370/311 |

FOREIGN PATENT DOCUMENTS

| | | |
|---|---|---|
| KR | 10-2004-0090018 A | 10/2004 |
| KR | 10-2011-0059240 A | 6/2011 |

* cited by examiner

METHOD AND APPARATUS OF TRANSMITTING PAGING FRAME AND WAKEUP FRAME

This application is a 35 USC §371 National Stage entry of International Application No. PCT/KR2012/006092, filed on Jul. 31, 2012, and claims priority of U.S. Provisional Application No. 61/528,152 filed Aug. 27, 2011, which are hereby incorporated by reference in its entirety.

TECHNICAL FIELD

The present invention relates to a wireless communication, more specifically, to a method of transmitting a paging frame and a wakeup frame.

BACKGROUND ART

Machine-to-Machine (M2M) systems are now drawing much attention as a next-generation communication technology and the IEEE 802.11 WLAN is developing a new standard to support M2M systems. An M2M system refers to a network in which machines rather than people communicate information with other machines. Temperature sensors, humidity sensors, cameras, home appliances such as TVs, processing machines in factories, large machines such as automobiles may form a part of M2M systems. As various types of new communication services such as smart grid, eHealth, and ubiquitous communication emerge, M2M technology is frequently employed to support such services. Features of M2M systems may be summarized as follows.

1) Large number of stations: Different from the existing networks, M2M systems assume a large number of stations. It is because an M2M system should take account of all the sensors installed at home or office as well as machines owned by individuals. Therefore, a significantly large number of stations may be connected to a single AP.
2) Low traffic load for each station: Since an M2M device relies on a traffic pattern of gathering and reporting peripheral information, the information should not necessarily be transmitted often and the amount of information is also small.
3) Uplink-centric: In most cases, an M2M system receives commands through downlink transmission and takes relevant actions and reports resultant data through uplink transmission. Since most of important data are usually transmitted through uplink transmission, M2M systems can be considered an uplink-centric system.
4) Long lifetime of stations: A typical M2M device operates by battery and it may be difficult for a simple user to charge battery frequently. Therefore, M2M systems are required to minimize battery consumption, thus providing long lifetime of operation.
5) Automatic recovery function: Since in some special situations, it may be hard for a user to directly operate M2M devices, automatic recovery function should be implemented.

In the M2M environment, an STA refers to a machine gathering and providing information; therefore, a pre-assigned AP/network should be able to control all of the M2M devices. However, operation protocol of present STAs may cause a problem that since STAs can perform switching between power saving and sleep/awake mode on their owns, from the viewpoint of a user operating a server (AP), M2M devices may stay in the sleep mode when they are expected to be operating or in the awake mode when they are not required, consuming battery power.

SUMMARY OF INVENTION

Technical Problem

The present invention has been made in an effort to provide a method for associating STAs and APs in a WLAN system.

Another object of the present invention is to provide an apparatus for carrying out a method for associating STAs and APs.

Technical Solution

To solve the technical problems above, a method for operating a power save mode switching between active mode and sleep mode according to one aspect of the present invention comprises receiving a paging frame from an STA (station) in the power save mode and transmitting to the STA a wakeup frame for informing of existence of buffered data to be transmitted to the STA in response to the paging frame, where the paging frame may include a PLCP (Physical Layer Convergence Protocol) header; the PCLP header may include a waiting time field indicating a waiting time during which an STA is operated in the active mode to receive the wakeup frame; the wakeup frame may include a PLCP header; and the PLCP header may include a wakeup indication indicating the wakeup frame and a wakeup STA identification having information specifying the STA. The wakeup STA identification may include information about MAC address of the STA; the wakeup frame may further include a framebody; and the framebody may correspond to a frame comprising a field indicating a wakeup frame; and an address of an AP transmitting the wakeup frame and a wakeup duration field which is the information about a time period for which an STA receiving the address of the STA and the wakeup frame stays in the active mode for the buffered data transmission. The method for operating a power save mode may further comprise determining priorities for transmitting the wakeup frame among a plurality of APs having buffered data to be transmitted to the STA and the framebody may further include address information of an AP transmitting a wakeup frame to the STA after the wakeup frame transmitted to the STA. The PLCP header of the paging frame may further comprise paging frame indication for indicating the paging frame and paging STA identification including information about MAC address of the STA transmitting the paging frame.

To achieve the objective of the present invention described above, an AP according to another aspect of the present invention may comprise a transceiver receiving a paging frame from an STA and a processor generating a wakeup frame for informing of existence of buffered data to be transmitted to the STA in response to the paging frame, where the paging frame may include a PLCP (Physical Layer Convergence Protocol) header; the PCLP header may include a waiting time field indicating a waiting time during which an STA is operated in the active mode to receive the wakeup frame; the wakeup frame may include a PLCP header; and the PLCP header may include a wakeup indication indicating the wakeup frame and a wakeup STA identification having information specifying the STA. The wakeup STA identification may include information about MAC address of the STA; the wakeup frame may further include a framebody; and the framebody may correspond to a frame comprising a field indicating a wakeup frame; and an address of an AP transmitting the wakeup frame and a wakeup duration field which is the information about a time period for which an STA receiving the address of the STA and the wakeup frame stays in the active mode for the buffered data transmission. The processor may determine priorities for transmitting the wakeup frame among a plurality of APs having buffered data to be transmitted to the STA and the framebody may further include address information of an AP transmitting a wakeup frame to the STA after the wakeup frame transmitted to the STA. The PLCP header of the paging frame may further comprise paging frame indication for indicating the paging frame and paging STA identification including information about MAC address of the STA transmitting the paging frame.

A method for operating a power save mode switching between active mode and sleep mode according to yet another aspect of the present invention comprises receiving a first wakeup negotiation frame including a first transmission priority field for transmitting first data from an AP (access point) to an STA (station), transmitting a second wakeup negotiation frame including a second transmission priority field for transmitting second data to the AP, and determining priority of the second data based on the first transmission priority field and the second transmission priority field. The method for operating in power save mode may comprise receiving a paging frame from the STA operating in power save mode where active mode and sleep mode is switched and if transmission priority of the second data is the highest priority, transmitting to the STA a wakeup frame for informing of existence of the second data within a waiting time in response to the paging frame, where the paging frame may include a PLCP (Physical Layer Convergence Protocol) header; the PCLP header may include a waiting time field indicating a waiting time during which an STA is operated in the active mode to receive the wakeup frame; the wakeup frame may include a PLCP header; and the PLCP header may include a wakeup indication indicating the wakeup frame and a wakeup STA identification having information specifying the STA. The wakeup STA identification may include information about MAC address of the STA; the wakeup frame may further include a framebody; and the framebody may correspond to a frame comprising a field indicating a wakeup frame; and an address of an AP transmitting the wakeup frame and a wakeup duration field which is the information about a time period for which an STA receiving the address of the STA and the wakeup frame stays in the active mode for the buffered data transmission. The framebody may further include address information of an AP to which, after the wakeup frame, a wakeup frame is to be transmitted. The PLCP header of the paging frame may further comprise paging frame indication for indicating the paging frame and paging STA identification including information about MAC address of the STA transmitting the paging frame. The second wakeup negotiation frame may correspond to a frame comprising information indicating a wakeup negotiation frame, address of an AP transmitting the second wakeup negotiation frame, and a second transmission priority field based on random numbers.

Advantageous Effects

According to a method for transmitting a paging frame and a wakeup frame and an apparatus using the method according to embodiments of the present invention as described above, through a method of an STA broadcasting a paging frame and receiving a wakeup frame from an AP in response to the paging frame, the STA can reduce the power wasted in the active mode.

MODE FOR INVENTION

Figure 1:
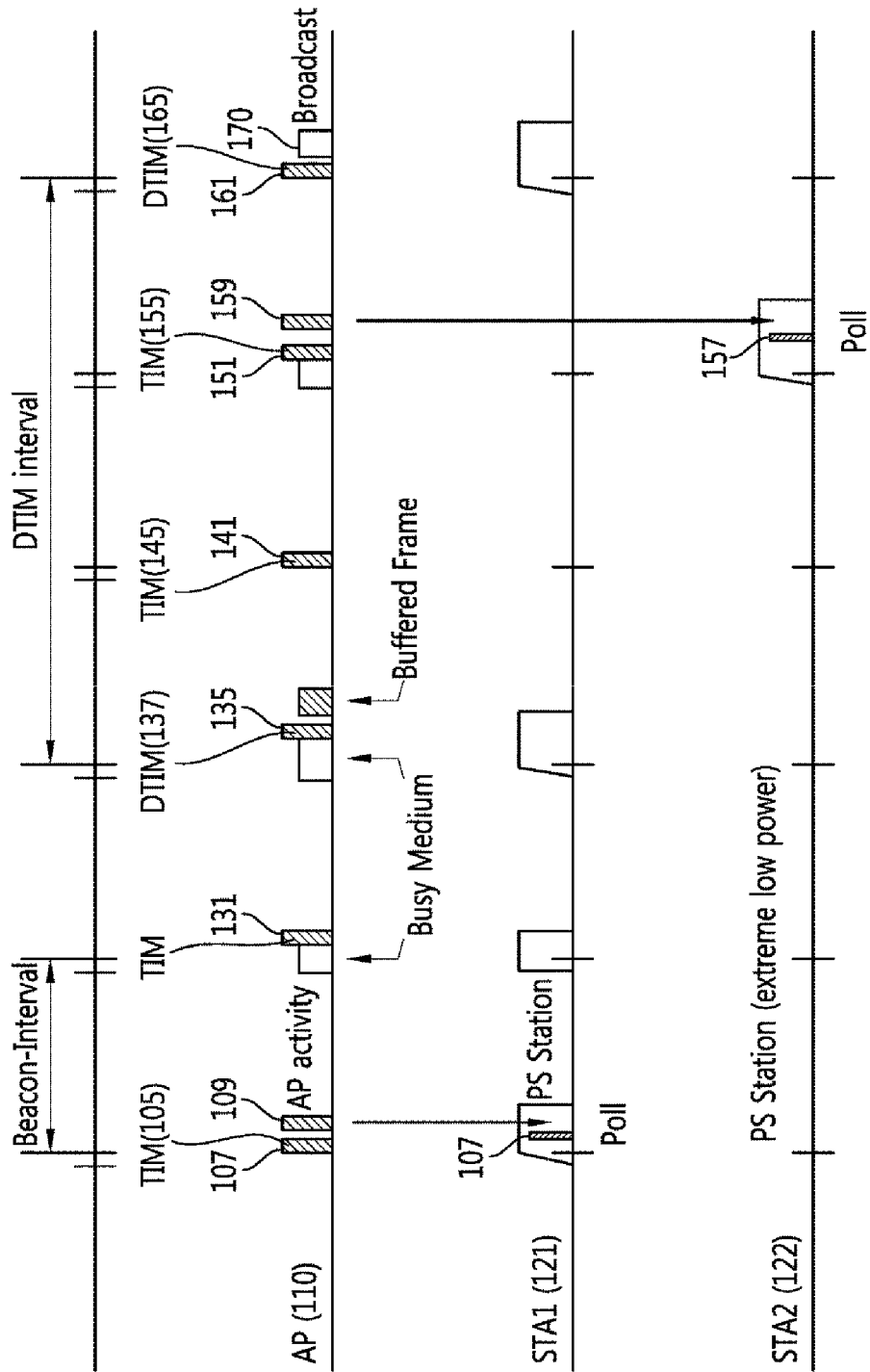
FIG. 1 illustrates a method for using power save mode in the existing wireless LAN.

The embodiments of the present invention in the following will assume M2M systems for the convenience of description. What are proposed in this document are not limited to M2M systems but can be applied to conventional WLAN systems in various ways.

First, if we examine the most popular network model, server/client structure rather than M2M communication, a client (station, STA) requests information from a server and the server provides the requested information in most cases. At this time, the server which has provided the information may be regarded a machine gathering and providing information in a predetermined way while the subject receiving the information is a user who uses the client (station). Due to the network structure above, communication technologies are largely downlink centric. However, in an M2M network, the roles are changed; a client (station), which is a machine, gathers and provides information whereas the user managing the server requires information from the client. For example, if an M2M server issues a command to measure the surrounding environment upon an M2M terminal, the terminal gathers information according to the command from the server and reports the information to the server. In other words, different from the previous communication technologies, in the M2M communication, a user approaches the network from the server side and information may flow in the opposite direction of conventional communication technologies. Therefore, to realize effective M2M communication, functions implemented for the existing STAs should be reduced and the management function of a server should be expanded.

STAs in the existing systems can correspond to terminals that are used directly by the users. Due to this reason, STAs could secure the right of choice and depending on situations, STAs operated according to the user's choice. In particular, from the standpoint of power consumption and power saving, users can play as primary actors to operate STAs. Therefore, user can control STAs' operation mode. For example, use can keep the STA in the sleep mode for a long time and use the STA by charging batteries whenever it is required. Moreover, keeping STAs in the sleep mode for a long time does not cause a problem in terms of network but it may be understood that operation of individual STA is defined according to the choice of the user who uses the corresponding STA.

On the other hand, since an STA corresponds to a machine gathering and providing information in the M2M environment, a pre-assigned AP/network should all be able to control the STA. However, existing STAs' operation protocols allow the STAs to choose their method for power saving and to change their mode between sleep mode and active mode independently. Therefore, it may be the case that the above feature causes such problem that M2M devices remain in the sleep mode while they are expected to be operating and M2M devices remain in the active mode while they are not expected to be operating.

For example, though an STA may not have data to transmit and thus stay in the sleep mode, there may be a case where firmware upgrade for the STA should be carried out or there exist buffered data to be transmitted to the corresponding STA in view of the user who operates the server. Therefore, needed is a method for minimizing power consumption of an STA in the sleep mode and at the same time, intermittently checking whether it is necessary to change to the active mode. For example, the method may be applied to such a case where an STA requires firmware upgrade. An STA may have moved to another place when the STA is in the sleep mode and the STA is not established association with any other AP. In other words, irrespective of whether the STA has established association with a particular AP, if an AP close to the STA and capable of transmitting data related to firmware upgrade makes a request for association, the STA should be able to carry out a method for establishing association with the corresponding AP and transmit data to the AP and receive data from the AP.

To solve the problem stated above, described in one embodiment of the present invention is a method for waking up occasionally an STA in the sleep mode; broadcasting a very short paging frame including MAC address information of the STA or STA identifying information similar to the MAC address; receiving a wakeup frame from other nearby APs in response to the paging frame; and establishing association with the corresponding AP if needed, and carrying out transmitting and receiving data to and from the AP.

Also, according to the embodiment of the present invention, if the STA which has broadcast a paging frame does not receive a wakeup frame from an AP for a particular waiting time, the STA may immediately enter into the sleep mode again. Following the procedure above, an M2M device can minimize unnecessary battery consumption and control the corresponding STA effectively in the active mode when an AP makes a request.

An STA refers to an arbitrary functional medium including medium access control (MAC) compliant with the IEEE (Institute of Electrical and Electronics Engineers) 802.11 standard and a physical layer interface for radio medium; in a wide sense, STA may be used and interpreted as a terminology incorporating both AP and non-AP stations.

An STA may be called in various ways: a mobile terminal, a wireless device, a wireless transmit/receive unit (WTRU), a user equipment (UE), a mobile station (MS), a mobile subscriber unit, or simply a user.

In what follows, for the convenience of description, in the embodiments of the present invention, an STA carrying out transmission of paging frames is called STA or paging STA, while an STA carrying out transmission of wakeup frames is called AP. However, the above definition is an arbitrary differentiation depending on their roles; in a broad sense, the AP and the STA may all be interpreted as an STA.

FIG. 1 illustrates a method for using power save mode in the existing wireless LAN.

The IEEE 802.11 standard provides a power saving mechanism (or power save mode) to increase lifetime of STAs. For power saving, an STA can operate by changing its operation mode into two modes: active mode and sleep mode. The active mode refers to the situation where all the normal operation such as transmission and reception of frames or channel scanning is ready to be carried out. On the contrary, the sleep mode refers to the mode where an STA reduces power consumption dramatically. Transmission and reception of frames are not possible, nor is channel scanning. By employing the power saving mechanism, an STA may remain in the sleep mode in normal conditions and change its mode to the active mode if needed, thereby reducing power consumption.

In the power save mode, the longer an STA remains in the sleep mode, the more reduced is power consumption of the STA and expected lifetime of the STA is increased. However, when an STA stays in the sleep mode and an AP has frames to transmit to the STA, since the STA is currently in the sleep mode, the STA can not receive the frames and does not know the fact that the AP has frames to receive. In other words, since an STA cannot transmit and receive frames in the sleep mode, the STA cannot stay all the way in the sleep mode. Therefore, an STA should check whether data to receive exist in an AP and from time to time change its mode from the sleep mode to the active mode to receive frames in the case of existence of data to receive in the AP. Meanwhile, the AP should inform the STA of information about existence of data to transmit to the STA according to the time at which the STA changes from the sleep mode to the active mode.

Again, with reference to FIG. 1, an AP 110 transmits beacon frames to STAs within a basic service set (BSS) with a predetermined period. A beacon frame includes a TIM (Traffic Indication Map information element). A TIM may include information about whether the AP 110 has buffered traffic to be transmitted to STAs which have received beacon frames. The TIM included in a beacon frame may be used for informing of existence of a unicast frame to be transmitted to an STA while DTIM (Delivery Traffic Indication Map) for informing of existence of a multicast or broadcast frame to be transmitted to an STA.

Periods with which TIM and DTIM of a beacon frame is transmitted may be set in a random fashion. For example, the AP 110 may transmit DTIM at every three TIM intervals.

STA1 121 and STA2 122 are STAs operating in the PS (Power Saving) mode. In other words, STA1 122 and STA2 122 may be set such that they change their mode from the sleep mode to the active mode at each wakeup interval of a particular period and receive TIM elements of beacon frames transmitted by the AP 110.

The wakeup interval may be set up such that the STA1 121 changes its mode from the sleep mode to the active mode at each beacon interval at which the AP 110 transmits beacon frames, thus receiving TIM or DTIM. For example, the STA1 121 may change to the active mode when the AP 110 first transmits a beacon frame 101. The STA1 121 receives the beacon frame 101 and obtains TIM 105 of the beacon frame 101. If the TIM 105 of the beacon frame 101 received by the STA1 121 indicates that the AP 110 has buffered data to be transmitted to the STA1 121, the STA1 121 transmits a PS poll frame 107 to the AP 110, requesting data transmission from the AP 110. The AP 110, in response to the PS poll frame 107, may transmit a frame 109 to the STA1 121 together with the data to be transmitted. The STA1 121 which completed data reception again switches to the sleep mode from the active mode.

When the AP 110 attempts to transmit a second beacon frame 131, the AP 110 is in a busy medium state where other devices occupies the AP 110; therefore, the AP 110 may not be able to transmit a beacon frame 131 precisely at the beacon interval but at a delayed time point. In the case of delayed transmission of a beacon frame 131 by the AP 110, the STA1 121 fails to receive the delayed beacon frame 131 even if the STA1 121 changes its operation mode to the active mode according to the beacon interval; therefore, the STA1 121 again changes its operation mode from the active mode to the sleep mode.

When the AP 110 transmits a third beacon frame 135, the corresponding beacon frame 135 may include DTIM 137. However, since the AP 110 is in the state of busy medium, the AP 110 performs delayed transmission of the beacon frame 135. The STA1 121 may switch from the sleep mode to the active mode according to the beacon interval and be able to obtain DTIM 137 through the beacon frame 135 transmitted by the AP 110. The STA1 121, based on the DTIM 137, can obtain information about whether the AP 110 has a multicast or broadcast frame to be transmitted to the STA1 121. In the case of non-existence of a multicast frame or broadcast frame to be transmitted to the STA1 121, the STA1 121 may switch to the sleep mode from the active mode.

The AP 110 transmits a fourth beacon frame 141. It should be noted that the STA1 121 could not obtain information from the previous two times of TIM reception about existence of data in the AP 110. In this case, the STA1 121 may adjust the wakeup interval for receiving TIM.

As another embodiment, the beacon frame 135 transmitted by the AP 110 may include signaling information for adjusting a wakeup interval of the STA1 121. In this case, the STA1 121 can adjust the wakeup interval based on the received beacon frame 135. For example, the STA1 121 may change its operation mode to the active mode every three beacon intervals while the mode change has been carried out every each beacon interval of the AP 110 so far. Therefore, since the STA1 121 stays in the sleep mode when the AP 110 transmits a fourth 141 and a fifth 151 beacon frame, the STA1 121 cannot obtain TIM elements 145, 155 of the beacon frames.

When the AP 110 transmits a sixth beacon frame 161, the STA1 121 changes its operation mode to the active mode and obtains DTIM 165 of the beacon frame.

STA1 121 obtains information about existence of a multicast or broadcast frame to be transmitted to the STA1 121 by interpreting the DTIM 165; if the STA1 detects that the AP 110 has multicast frame or broadcast frame to transmit, differently from the case of receiving a unicast frame, the STA1 121 receives a broadcast frame or a multicast frame 170 transmitted by the AP 110 without transmitting a PS poll frame to the AP 110.

Meanwhile, the STA2 122 operating in low power may set its wakeup status to have a longer period than that of the STA1 121. Therefore, the STA2 122 can switch its operation mode from the sleep mode to the active mode and receive the TIM 155 at the time when the AP 110 transmits the fifth beacon frame 151. The STA2 130 detects that the AP 110 has data to be transmitted to the STA2 130 by interpreting the TIM 155 and transmits a PS poll frame 157 to the AP 110 to make a request for transmission of the data. The AP 110, in response to the PS poll frame 157, can transmit buffered data 159 to the STA2 122.

Differently from the existing power saving methods for STAs described above, a power saving method according to an embodiment of the present invention allows an STA in the sleep mode to occasionally wake up and broadcast a very short paging frame including MAC address information of the STA or STA identifying information similar to the MAC address to APs. An STA can receive a wakeup frame in response to a paging frame broadcast by APs. An STA interprets the wakeup frame transmitted by the AP and if necessary, establishes association with the AP and carries out transmission and reception of data.

Also, in the embodiment of the present invention, if an STA which has broadcast a paging frame does not receive a wakeup frame for a predetermined waiting time, the STA may switch again from the active mode to the sleep mode. Therefore, the method according to the embodiment of the present invention can minimize unnecessary battery consumption of STAs and control the STAs to stay effectively in the active mode in case of request from the AP.

Figure 2:
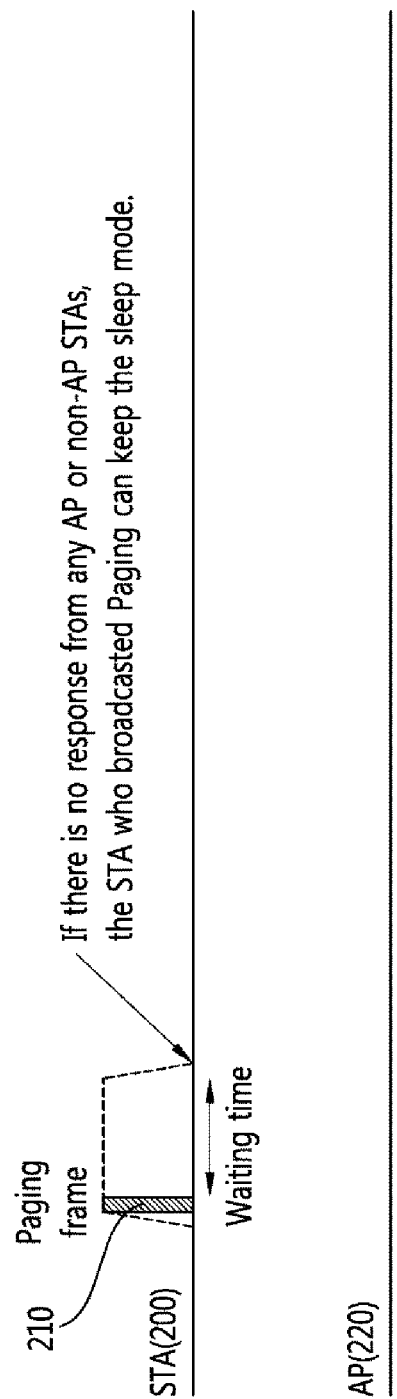
FIG. 2 illustrates an STA transmitting a paging frame according to an embodiment of the present invention.

FIG. 2 illustrates an STA transmitting a paging frame according to an embodiment of the present invention.

With reference to FIG. 2, if an STA 200 in the sleep mode broadcasts a paging frame 210 and does not receive any response from an AP 200 or other STAs for a predetermined time period (hereinafter, a response waiting time or waiting time stands for the same physical unit), the STA 200 may switch its operation mode to the sleep mode.

The waiting time may be predefined in many ways. The waiting time, which is defined as the time for an STA to receive a response signal measured right after the paging frame 210 is transmitted until the STA enters again into the sleep mode, may be predefined by, for example, "SIFS (Short Inter-Frame Space)", "PIFS (PCF Inter-Frame Space)", or "PIFS+slot(s)". In some cases, through additional field information such as length information of the L-SIG, which is described additionally, the AP 220 may be informed of the waiting time beforehand so that the AP 220 transmits a wakeup frame to the STA 200 within the waiting time of the STA 200.

During the waiting time, all of the APs having no intention to make a response to the STA 200 which has broadcast a paging frame 210 can set up a network allocation vector (NAV). In other words, those APs, which have no intention to make a response to the paging frame 210 of a paging STA and try carry out data transmission unrelated to the paging STA according to a conventional CSMA/CS procedure, can access the medium according to a conventional access procedure of performing NAV setting during the waiting time, carrying out DIFS+random backoff right after the waiting time, and so on.

In a method for managing power saving mode according to an embodiment of the present invention, an AP and an STA can establish association with each other when the STA broadcast a paging frame as the AP receiving the paging frame transmits a wakeup frame within the waiting time interval in response to the paging frame.

Figure 3:
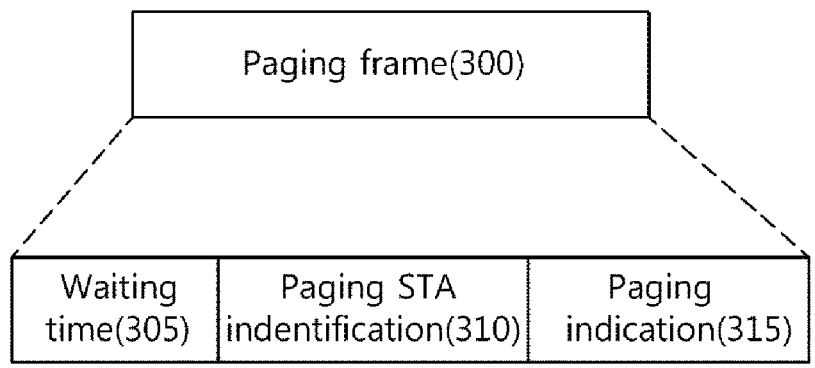
FIG. 3 illustrates a paging frame broadcast from an STA according to an embodiment of the present invention.

FIG. 3 illustrates a paging frame broadcast from an STA according to an embodiment of the present invention.

In a power save mode according to an embodiment of the present invention, an STA broadcasts a paging frame 300 to APs and receives a wakeup frame from an AP in response to the paging frame.

The paging frame 300 may be used as a paging means for an STA to notify to APs that the STA has woken up for a while from the sleep mode to the active mode. The paging frame 300 may be realized as a frame with a minimal length, including such information as MAC address of an STA with which a receiver receiving the paging frame 300 identifies which STA has transmitted the paging frame 300. For example, the paging frame 300 may correspond to a frame including PLCP header information.

With reference to FIG. 3, the paging frame 300 may comprise a waiting time field 305, paging STA identification 310, and paging indication 315. The waiting time field 305, paging STA identification 310, and paging indication 315 are so divided that information which can be included in the paging frame 300 is grouped into functionally independent field units. Therefore, the paging frame 300 may have a frame of various structure incorporating the waiting time field 305, paging STA identification 310, and paging indication 315 into the frame as at least one field information; and the paging frame 300 having such various structure belongs to the technical scope of the present invention.

Besides the waiting time field 305, paging STA identification 310, and paging indication 315, the paging frame 300 may include additional field information required for data transmission and reception; and the paging frame having the structure above also belongs to the technical scope of the present invention.

In addition, instead of defining a new frame to carry out paging, modifying part of field information included in a frame already defined in the existing 802.11 WLAN standard and using the part as the paging frame to carry out paging are also possible. An embodiment related to the above will be disclosed with reference to FIG. 4.

The waiting time field 305 corresponds to the time during which an STA which has transmitted a paging frame 300 is kept in the active mode. The waiting time field 305 includes information about waiting time during which a wakeup frame, which is a response to the paging frame 300 and transmitted from an AP, can be received. If the waiting time is over, the STA may switch from the active mode to the sleep mode.

The paging indication 315 may be used as information for indicating that the current frame in transmission corresponds to a paging frame.

The paging STA identification 310 indicates the information of an STA and includes information for specifying the STA. For example, the paging STA identification 310 may include an MAC address of 48 bits for the corresponding STA. As a different example, instead of incorporating the whole MAC address of the corresponding STA into the paging STA identification 310, only part of the MAC address of the paging STA may be included in the paging STA identification 310. For example, a paging STA may be indicated by mapping 12 LSBs (Least Significant Bits) of the MAC address of the paging STA into the paging STA identification 310 or incorporating into the paging STA indication 310 various forms of compressed information such as the information created by compressing the MAC address of the paging STA in 12 bits based on a particular hashing algorithm.

Figure 4:
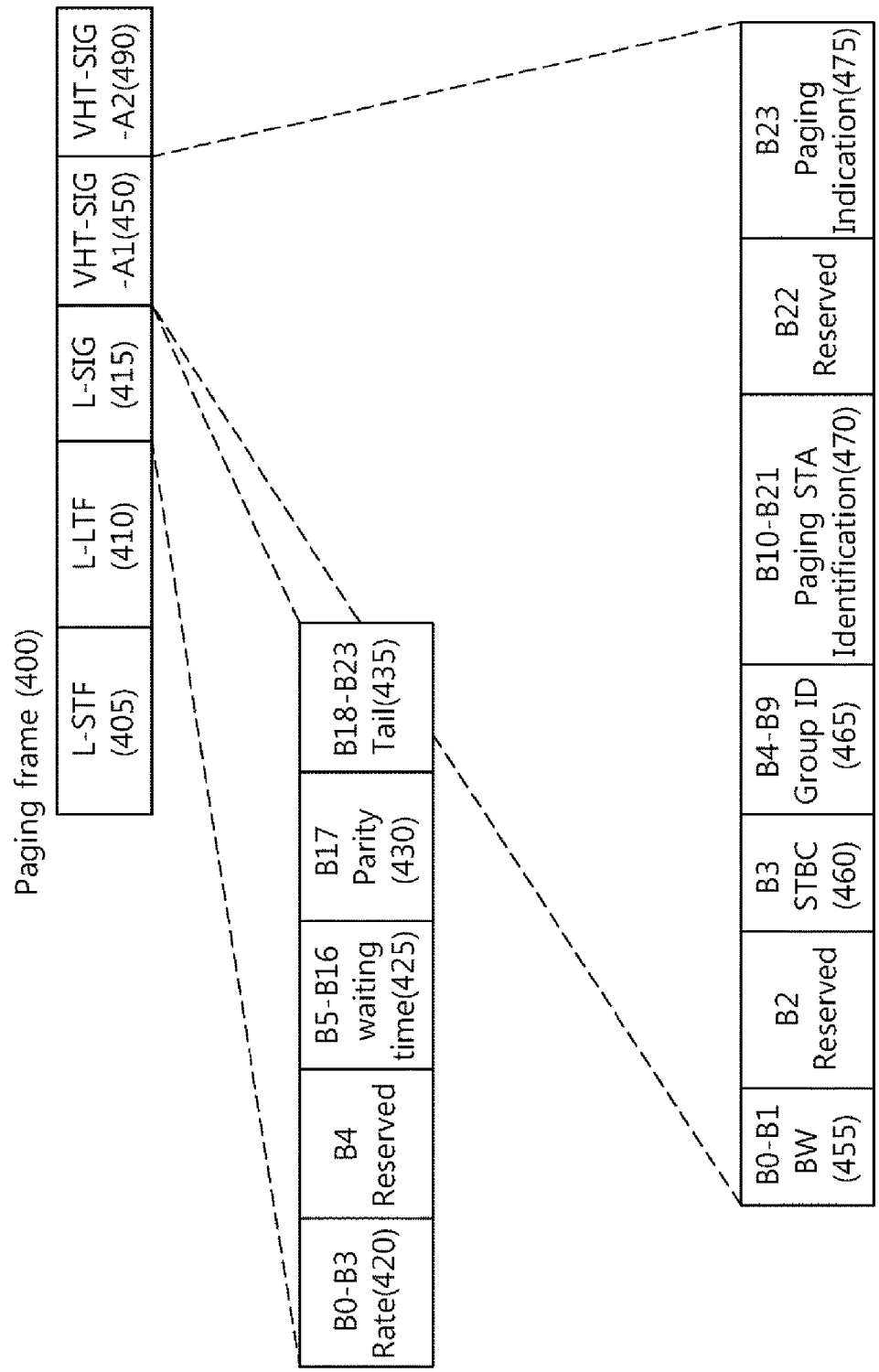
FIG. 4 illustrates a paging frame using a frame defined in the existing 802.11 WLAN standard according to an embodiment of the present invention.

FIG. 4 illustrates a paging frame using a frame defined in the existing 802.11 WLAN standard according to an embodiment of the present invention.

The paging frame of FIG. 4 may employ the VHT PPDU frame in Section 22.3 of the IEEE P802.11ac™/D0.3 Part 11: Wireless LAN Medium Access Control (MAC) and Physical Layer (PHY) specifications Amendment 5: Enhancements for Very High Throughput for Operation in Bands below 6 GHz (hereinafter, it is called "802.11ac") disclosed at April 2011.

With reference to FIG. 4, the paging frame 400 may correspond to a frame with a short length comprising only a part of the fields from the VHT PPDU frame.

The following briefly describes each field of the paging frame 400.

(1) L-STF 405 stands for legacy short training field and is positioned at the forefront of the PLCP header and carries out frame timing acquisition and automatic gain control.

(2) L-LTF 410 stands for legacy long training and may be used for channel estimation to demodulate L-SIG 415 and data.

(3) L-SIG 415 includes information for demodulating and decoding data subsequent to L-SIG 415.

(4) VHT-SIG-A1 450 is one of VHT-SIG-A fields. VHT-SIG-A, VHT-STF, VHT-LTF, and VHT-SIG-B can exist only in the packets of VHT system. VHT-SiG-A includes information for describing VHT format packets and includes information commonly required for all the STAs. VHT-SIG-A comprises VHT-SIG-A1 450 and VHT-SIG-A2 480 field.

VHT-SIG-A1 450 includes information about bandwidth of a channel in use, whether space time block coding (STBC) is employed, a group ID for indicating a group used for transmission of STAs in a grouped MU-MIMO system, the number of streams in use, and the like.

(5) On the other hand, VHT-SIG-A2 490 includes information about short guard interval (GI), FEC, modulation and coding scheme (MCS) for a single user, or type of channel coding for multi-users; information about beam-forming; redundancy bits for cyclic redundancy checking (CRC); and tail bits of convolutional decoder. The following provides additional description about information included in the L-SIG 415.

(6) Rate field 420 informs of data rate, capable of carrying out data rate information in 4 bit space. For example, as a data rate value, a value of 6, 9, 12, 18, 24, 36, 48, and 54 Mb/s may be transmitted.

(7) waiting time field 425 may indicate time information for an STA to wait for a wakeup frame in response to a paging frame. If a wakeup frame is not received during the waiting time, the STA may switch to the sleep mode.

(8) Parity 430 corresponds to 1 bit parity information; if the number of 1s found in a total of 16 bits (Rate 4 bits+Length 12 bits) preceding the parity bit is an even number, 0 is mapped to the parity field whereas 1 is mapped if the number of 1s is an odd number; thereby allowing a receiving STA to check once more whether it has received information of 16 bits correctly.

(9) TAIL 435 corresponds to a field of 6 bits and 0 can be mapped to all of the bits. The TAIL field is encoded by a convolutional code and at the time of reception, the TAIL field goes through a convolutional decoder; at this time, 6 bits of TAIL field should be filled with zeros during the Viterbi decoding process. The TAIL 435 field may be used for convolutional encoding and decoding.

The following provides additional description about information included in the VHT-SIG-A1 450.

(10) BW 455 may carry transmission bandwidth information of a VHT system. For example, BW 455 may comprise two bits, informing of transmission bandwidth (20, 40, 80, 160 MHz and so on) of a current frame.

(11) STBC 460 may correspond to 1 bit information informing of whether the space time block coding (STBC) is in use or not.

(12) Group ID 465, being related to a multi-user (MU) transmission method supported by the VHT system, may inform of a group ID for indicating a group used for transmission of STAs in a grouped MU-MIMO system.

(13) paging STA identification 470 may include information indicating a paging STA. For example, paging STA identification 470 may include information related to an MAC address of a paging STA. If bit width to be assigned for the paging STA identification 470 is not enough, only a part of the MAC address of the paging STA may be included in the paging STA identification 470.

As another example, paging STA identification 470 having a bit width of 12 bits may perform mapping of 12 LSB bits of the MAC address of a paging STA or including various forms of compressed information such as the information created by compressing the MAC address of the paging STA in 12 bits based on a particular hashing algorithm.

APs receiving a paging frame, if buffered data to transmit to an STA exist and the destination address of a data frame coincides with the information of the paging STA identification 470, first transmits a wakeup frame requesting the paging STA to stay awaken continuously, thereby carrying out a checking procedure for a correct MAC address.

(14) Paging indication 475 corresponds to the information consisting of 1 bit, capable of indicating whether a received frame is a paging frame or not. For example, if the value of paging indication 475 of a frame is '0', the corresponding frame is regarded a paging frame and 12 bit information of B10-B21 may be interpreted as the paging STA identification information, carrying identifying information of an STA transmitting the frame. If the value of paging indication 475 of the frame is '1', the frame transmitted may correspond to a conventional VHT PPDU frame and 12 bit information of B10-B21 may be interpreted as the information expressing $N_{STS}$ denoting the number of space-time streams.

Figure 5:
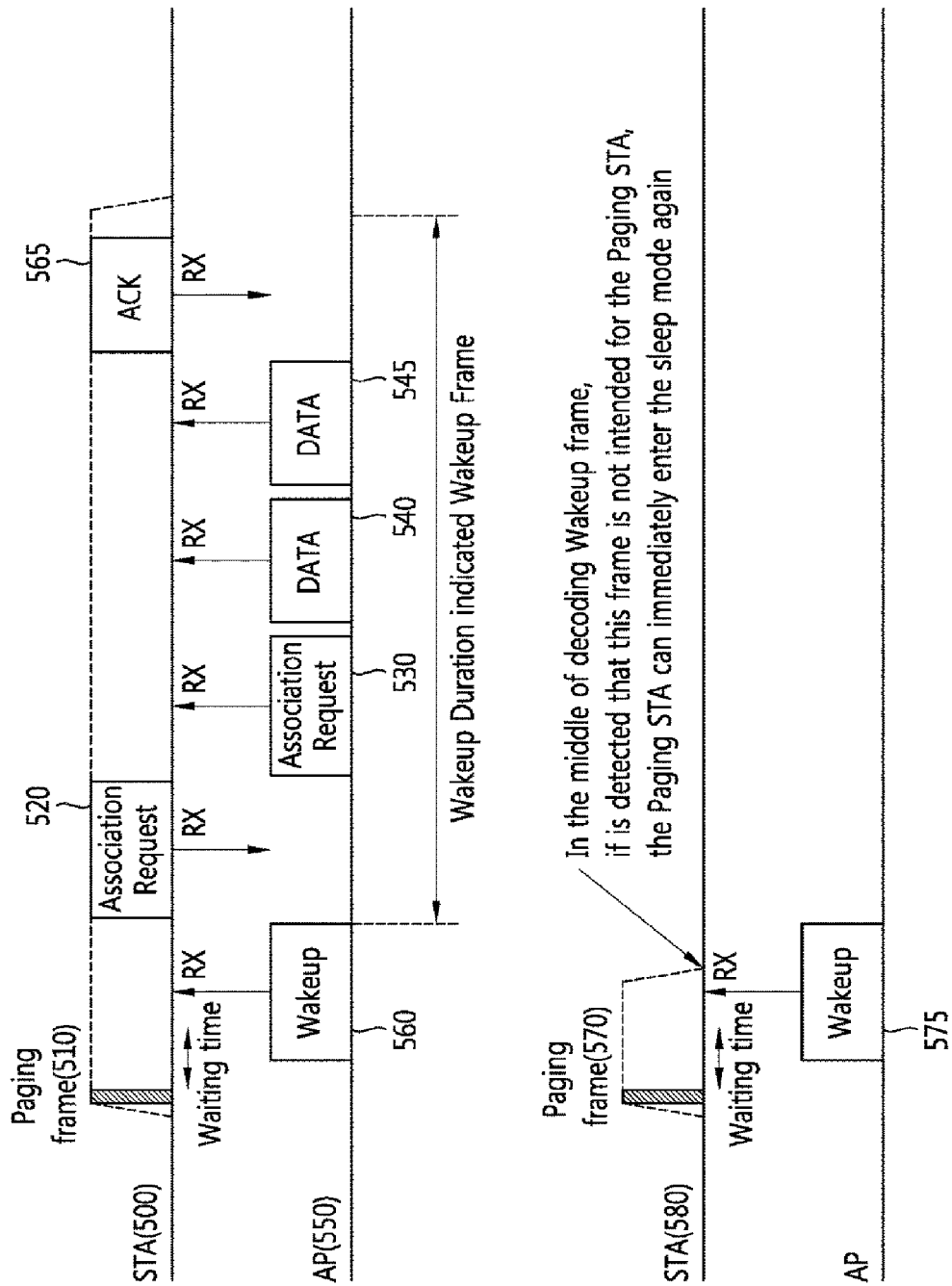
FIG. 5 illustrates a method for an AP to transmit a wakeup frame according to an embodiment of the present invention.

FIG. 5 illustrates a method for an AP to transmit a wakeup frame according to an embodiment of the present invention.

With reference to FIG. 5, an STA 500 may broadcast a paging frame 510. The STA 500, after broadcasting a paging frame 510, may wait for transmission of a wakeup frame 560 from an AP for a predetermined waiting time 515. If a wakeup frame 560 is transmitted to the STA 500 during the waiting time 515, the STA 500 can determine, based on wakeup STA identification and wakeup indication information included in the preamble of the wakeup frame 560, whether the received wakeup frame 560 is a response to the paging frame 510 transmitted by the STA 500.

The upper part of FIG. 5 represents the case where a wakeup frame 560 received from the AP 550 corresponds to a response to the paging frame 510 transmitted by the STA 500.

(1) If the wakeup frame 560 received by the STA 500 corresponds to a response to the paging frame 510 transmitted by the STA 500, the STA 500 may transmit an association request frame 520 to the AP 550.

(2) The AP 550 may transmit an association response frame 530 to the STA 500 in response to the association request frame 520

(3) The AP 550, after being associated with the STA 500, can communicate DATA 540, 545 with the paging STA 500 and the paging STA 500 transmits ACK signal 565 after transmitting and receiving DATA 540, 545 and switch from the active mode to the sleep mode.

The lower part FIG. 5 represents the case where a wakeup frame 575 received does not correspond to a response to the paging frame 570 transmitted by an STA 580.

(1) An STA 580 in the sleep mode broadcasts a paging frame 570 and a wakeup frame 575 is transmitted from an AP 590 within a waiting time 573.

(2) While the STA 580 decodes the wakeup frame 575 transmitted, it may be detected that the paging STA identification of VHT-SIG-A1 of the wakeup frame 575 transmitted by the AP 590 has nothing to do with the MAC address information of the STA 580. In this case, the STA 580 can immediately switch from the active mode back to the sleep mode without necessarily decoding the subsequent part of the wakeup frame 575.

In other words, in order to carry out the power save mode, a paging frame may be received from the STA operating in the power save mode where an STA switches between the active mode and the sleep mode. In response to the paging frame, transmitted to the STA may be the wakeup frame for informing of existence of buffered data to be transmitted to the STA.

Figure 6:
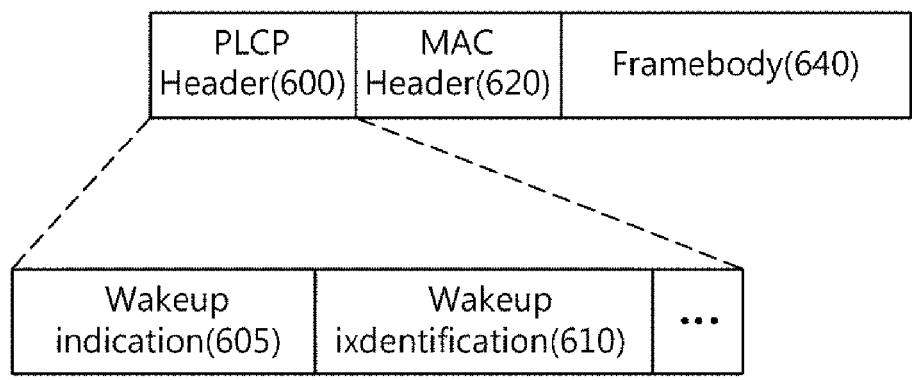
FIG. 6 illustrates a wakeup frame according to an embodiment of the present invention.

FIG. 6 illustrates a wakeup frame according to an embodiment of the present invention.

With reference to FIG. 6, a wakeup frame may comprise a PLCP (Physical Layer Convergence Procedure) header 600, an MAC header 620, and a framebody 640.

The PLCP header 600 may comprise wakeup indication 605 and wakeup STA identification 610. The STA receiving a wakeup frame, based on the wakeup indication 605 and wakeup STA identification 610 included in the PLCP header 600, can obtain information about whether the received frame is a wakeup frame and information about whether the received wakeup frame corresponds to the wakeup frame directed toward the STA itself.

The MAC header 620 corresponds to the header information generated at the MAC layer and may have the MAC header structure in Section 8.2 of the IEEE P802.11ac/D1.0 "Part 11: Wireless LAN Medium Access Control (MAC) and Physical Layer (PHY) specifications: Amendment 5: Enhancements for Very High Throughput for Operation in Bands below 6 GHz" (hereinafter, "802.11ac") disclosed at May 2011.

The framebody 640 may comprise information related active mode, for example, AP address transmitting wakeup frame, STA address receiving wakeup frame and duration information maintaining active mode by STA, etc.

In what follows in the embodiments of the present invention, VHT PPDU frame format disclosed in 802.11ac chapter 22.3 may be one embodiment of wakeup frame.

However, the wakeup frame, not limited to such frame structure as described above, may assume various forms of frame structure having a PLCP header 600 including the aforementioned information, an MAC header 620, and a framebody 640 and various wakeup frames described above also belong to the technical scope of the present invention.

Figure 7:
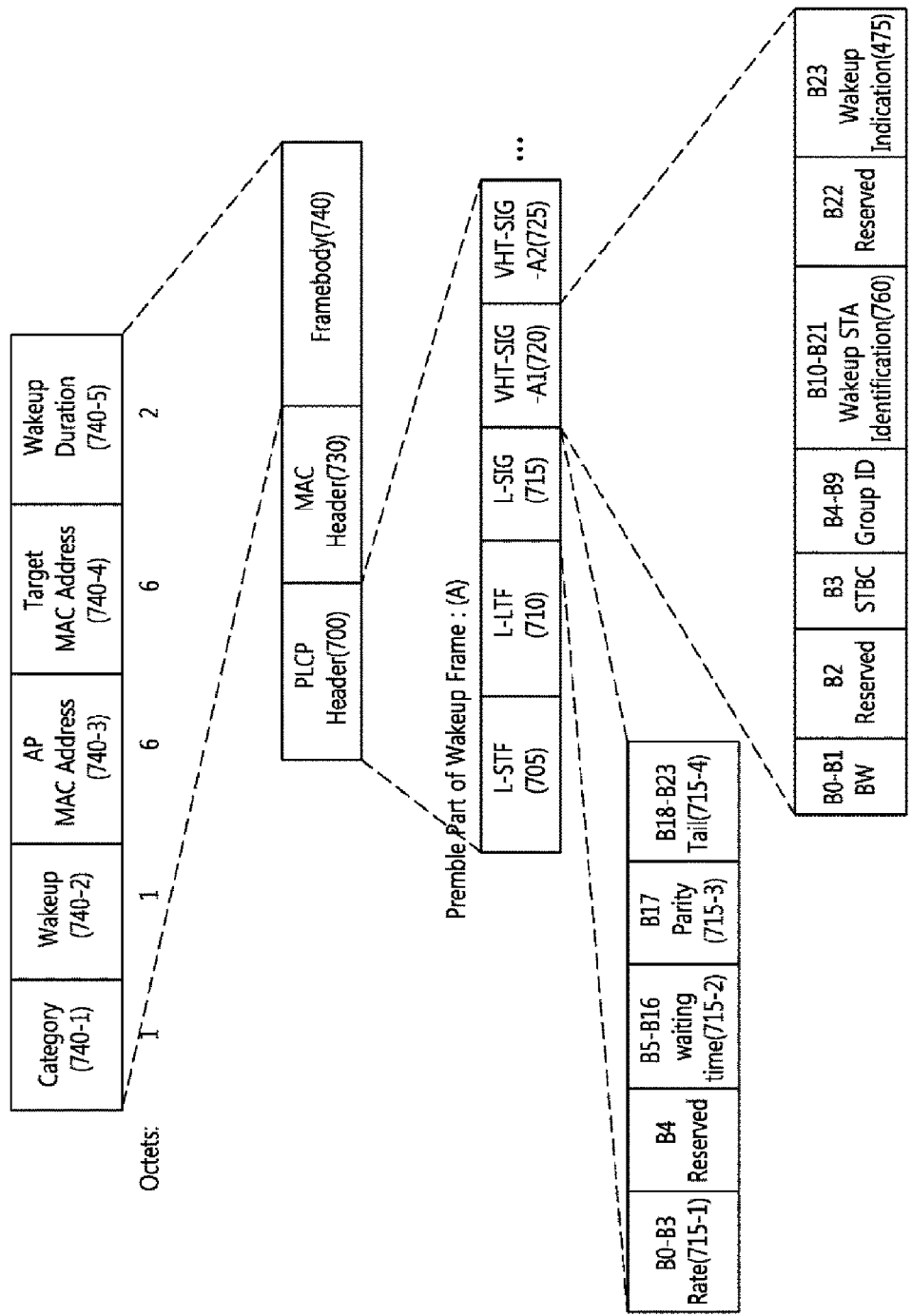
FIG. 7 illustrates a wakeup frame according to an embodiment of the present invention.

FIG. 7 illustrates a wakeup frame according to an embodiment of the present invention.

With reference to FIG. 7, a wakeup frame may comprise a PLCP header 700, an MAC header 720, and a framebody 740.

As an embodiment of a wakeup frame generated by using the VHT PPDU frame format, the PLCP header 700 of the wakeup frame may include L-STF 705, L-LTF 710, L-SIG 715, VHT-SIG-A1 720, and so on. L-STF 705, L-LTF 710, and VHT-SIG-A2 725 may include the same field information as the paging frame described above.

The paging frame and wakeup frame described above can be differentiated from each other as shown below.

Length 715-2 included in the L-SIG 715 may include information about the total length of a wakeup frame. In the case of the previous paging frame, a waiting time field is included in the B5~B16 positions, providing information about a duration value for which an STA stays in the active mode. However, in the case of a wakeup frame, length field 715-2 is included in the B5~B16 positions, providing the total length information of the wakeup frame.

The wakeup indication 750 of the VHT-SIG-A1 720 may include information indicating that a received frame corresponds to a wakeup frame. For example, if it is assumed that the wakeup indication 750 has the size of 1 bit and the wakeup indication 750 has the value of '0', the transmitted frame indicates a wakeup frame, while if the wakeup indication 750 has the value of '1', the transmitted frame indicates a conventional VHT PPDU format.

Therefore, information up to wakeup indication 750 from the wakeup frame would be sufficient for an STA to obtain information about whether the corresponding frame is a wakeup frame or VHT PPDU frame. If a transmitted frame turns out not to be a wakeup frame based on a decision up to the wakeup indication 750, a decoding process for received frame information subsequent thereto can be omitted and directly switch to the sleep mode from the active mode, thereby improving a power saving effect.

The wakeup STA identification 760 of the VHT-SIG-A1 720 may include information about which STA a wakeup frame is related to. The wakeup STA indication 760 may include information based on address information of an STA which has transmitted a paging frame. For example, the paging STA identification information included in a paging frame received by an STA may be included again in the wakeup STA identification of the wakeup frame. Similarly, information created by compressing the paging STA identification information may be included in the wakeup STA identification of the wakeup frame. A yet another method can generate a wakeup STA identification 760 different from the paging frame in a form of partly overlapping with a method of generating a wakeup STA identification from the paging frame (e.g., a method of mapping 12 LSBs among the MAC address of an STA) or in a form disjoint from the above method (e.g., a method of mapping 12 MSBs (Most Significant Bits) rather than LSBs). In other words, though the value of wakeup STA identification 760 in a wakeup frame and the value of paging STA identification in a paging frame may differ from each other, since each of the values reflects a part of the MAC address of an STA, if the two pieces of information are combined, a lot more precise verification may be achieved.

A still another method may also use an identification method of generating wakeup STA identification 760 of a wakeup frame according to a predetermined hashing algorithm and communicating information between an STA and an AP.

An STA receiving a wakeup frame, by decoding information up to the VHT-SIG-A1 720 included in the PLCP header 700 of the wakeup frame, can know the information about whether a transmitted frame is a wakeup frame and the frame corresponds to a wakeup frame directed toward the STA itself.

The MAC header 730 corresponds to the header information generated at the MAC layer and may have the MAC header structure in Section 8.2 of the IEEE P802.11ac/D1.0 "Part 11: Wireless LAN Medium Access Control (MAC) and Physical Layer (PHY) specifications: Amendment 5: Enhancements for Very High Throughput for Operation in Bands below 6 GHz" (hereinafter, "802.11ac") disclosed at May 2011.

The framebody 740 can include category 740-1, wakeup 740-2, AP MAC address 740-3, target MAC address 740-4, and wakeup duration 740-5.

The category 740-1 may be used as information for classifying frames according to their functions. In other words, the category 740-1 can include information about which category the corresponding frame belongs to.

The wakeup 740-2, as a specific function, may indicate that a frame corresponds to a wakeup frame according to the category 740-1.

The AP MAC address 740-3 may include MAC address information of an AP receiving a paging frame and trying to request a wakeup from a paging STA.

The target MAC address 740-4 may indicate the MAC address information of an STA supposed to transmit a wakeup frame.

Mapped to the wakeup duration 740-5 may be the information about time for which an STA receiving a wakeup frame stays in the awake mode to transmit and receive data may be.

According to an embodiment of the present invention, if a paging frame is broadcast by an STA, an AP which has received the paging frame may transmit a wakeup frame within a waiting time of the STA. The STA which has received the wakeup frame, as described earlier, based on the wakeup STA identification 760 included in the PLCP header 700, can obtain information about whether a transmitted frame corresponds to the wakeup frame directed toward the STA itself. Also, by determining whether the target MAC address 740-4 included additionally in the frame body 740 of the wakeup frame corresponds to the MAC address of the STA, obtained can be the information about whether a transmitted frame corresponds to the wakeup frame directed toward the STA itself.

If the target MAC address 740-4 coincides with the MAC address of an STA, the STA transmits an association request frame to the AP and the AP, after establishing association with the STA by using an association response frame as a response to the STA, may carry out transmission and reception of data to and from the STA.

According to still another embodiment of the present invention, before an AP transmits a wakeup frame to the STA, APs may perform negotiation between them and determine wakeup frame transmission priorities.

A negotiation method for determining transmission priorities between APs to be described later discloses a priority determination method based on random numbers; however, it should be understood that the method is only one example of determining transmission priorities and various other priority determination methods may be employed as well as the random numbers.

Figure 8:
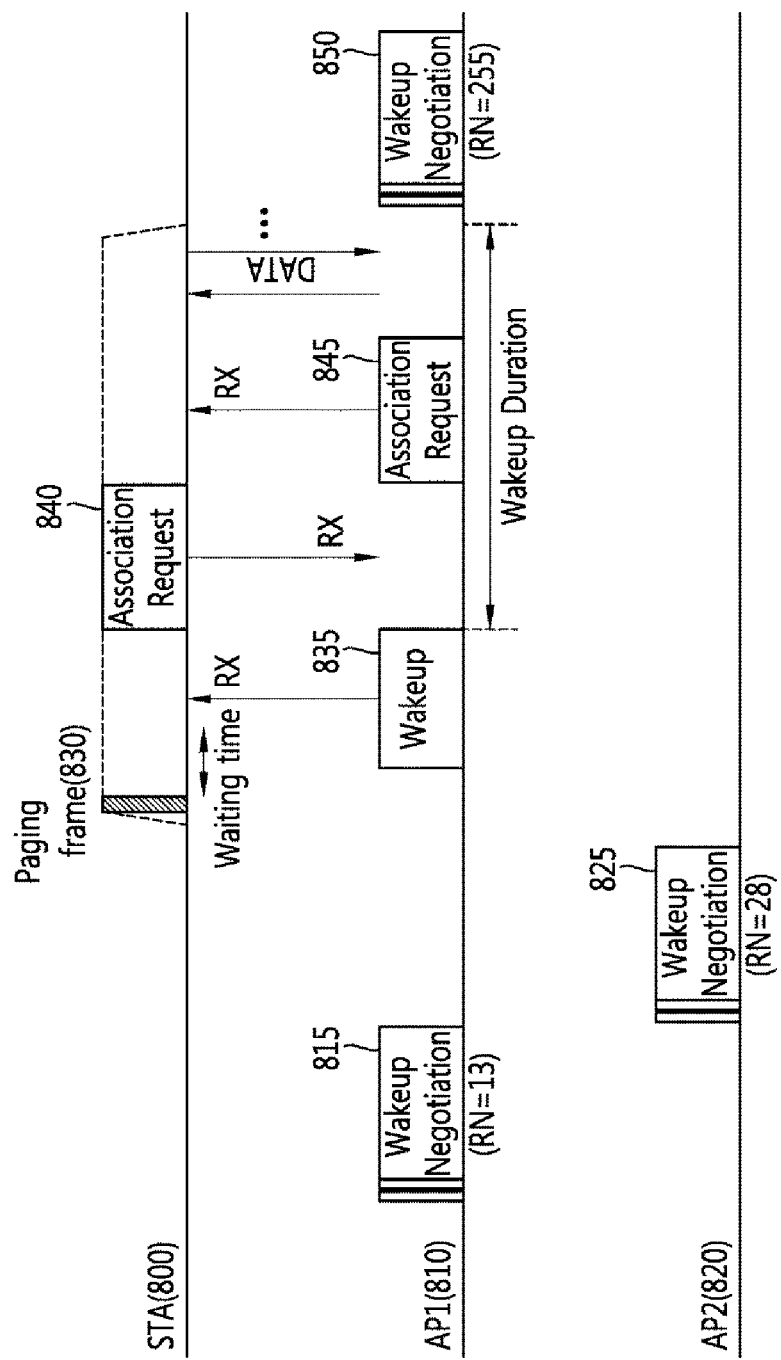
FIG. 8 illustrates a method for transmitting a wakeup negotiation frame between APs according to an embodiment of the present invention.

FIG. 8 illustrates a method for transmitting a wakeup negotiation frame between APs according to an embodiment of the present invention.

With reference to FIG. 8, an STA 800 is in the sleep mode and two APs, AP1 810 and AP2 820, may exist near the STA 800.

(1) First, if the AP1 810 has data to transmit to the STA 800, the AP1 810 may broadcast a wakeup negotiation frame 815 according to a contention-based medium access method following a CSMA/CS procedure. The wakeup negotiation frame 815 may include random numbers. At this time, it is assumed that the random number (RN) which determines the transmission priority included in the wakeup negotiation frame 815 broadcast by the AP1 810 is 13.

(2) Same to the AP1, if the AP2 820 has data to transmit to the STA 800, the AP2 820 may broadcast a wakeup negotiation frame 825 according to a CSMA/CS procedure. At this time, it is assumed that the value of RN included in the wakeup negotiation of the AP2 820 is 28.

(3) AP1 810 and AP2 820 can receive wakeup negotiation frames transmitted from each other and know their wakeup frame priority. Since the RN value 13 included in the wakeup negotiation frame 815 of the AP1 810 is smaller than the RN value included in the wakeup negotiation frame 815 of the AP2 820, the AP1 810 can transmit wakeup frames for the first place.

(4) An STA in the sleep mode may switch to the active mode and transmit a paging frame 830; the AP1 810 which has received the paging frame 830 can transmit a wakeup frame 835 within a waiting time ahead of the AP2 820.

(5) The STA 800 may transmit an association request frame 840 in response to the transmitted wakeup frame 835. As the AP1 810 transmits an association response frame 845 to the STA 800 in response to the association request frame 840, the AP1 810 and the STA 800 may establish association with each other. Afterwards, a conventional data transmission and reception process is performed and the STA 800 again switches to the sleep mode at the end of the wakeup duration.

(6) After the STA 800 entered again into the sleep mode, the AP1 810 may broadcast a wakeup negotiation frame including an RN value of 255 by accessing again the medium according to the CSMA/CS procedure. Broadcasting a wakeup negotiation frame 850 including an RN value of 255 may indicate that since the wakeup negotiation frame is transmitted by including the largest possible value of RN, the AP1 has no more buffered data to transmit to the paging STA. The AP2 820, which has received the wakeup negotiation frame and now has a higher priority than the AP1 810 as the RN value (=28) of the AP2 820 has become smaller than that (=255) of the AP1 810, can carry out data transmission while responding to the paging STA 800 by using a wakeup frame when it is time for the paging STA 800 again to transmit a paging frame.

As described above, if the RN value of 255 is interpreted to have only one indication of no more buffered data, when an AP has data to transmit, RN values for the wakeup negotiation frame to be broadcast can take only a positive integer ranging from 0 to 254. The RN value of 255 may be used as an indicator informing that an AP which has completed transmission of buffered data has no more data to transmit.

From the standpoint of a single AP, the following operation may be carried out.

(1) An AP receives from a different AP a first wakeup negotiation frame including a first transmission priority field which carries priority information for transmitting data stored in the different AP to an STA. In other words, if the different AP has buffered data to be transmitted to the STA, the different AP may carry out negotiation by transmitting the first wakeup negotiation frame.

(2) If the current AP has buffered data to be transmitted to the STA, the current AP broadcasts for the other APs a second wakeup negotiation frame including a second transmission priority field which carries priority information for transmitting buffered data.

(3) Based on the transmission priority information of the first transmission priority field transmitted from the different AP and the transmission priority information of the second transmission priority field broadcast by the current AP, transmission priority of buffered data of the current AP can be determined.

Figure 9:
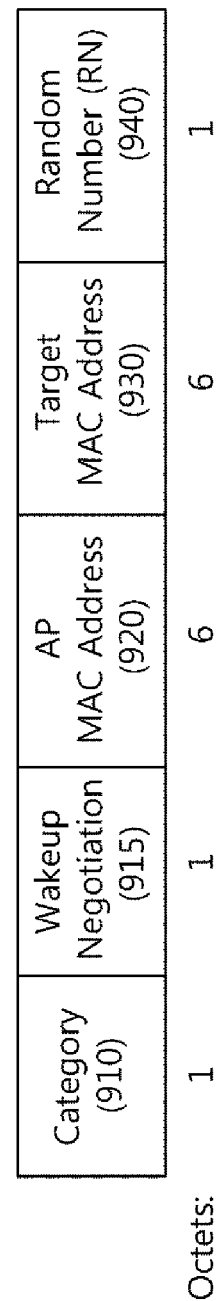
FIG. 9 illustrates a part of a wakeup negotiation frame transmitted by an AP according to an embodiment of the present invention.

FIG. 9 illustrates a part of a wakeup negotiation frame transmitted by an AP according to an embodiment of the present invention.

According to an embodiment of the present invention, by exchanging wakeup negotiation frames beforehand between APs according to a conventional procedure such as CSMA/CS, priorities with which wakeup frames are transmitted at the time when an STA transmits a paging frame can be negotiated in advance between APs. Therefore, based on wakeup negotiation frames, priorities with which buffered data are transmitted to each of APs may be determined.

In the framebody of a wakeup negotiation frame, a frame may comprise wakeup negotiation frame information, AP address information, address information of an STA for which a frame is transmitted, and priority related information. A wakeup negotiation frame may be generated by newly defining frame structure including the information above or may be defined by using the existing frame structure. In what follows, in an embodiment of the present invention, a method for defining a wakeup negotiation frame by using the framebody of the VHT PPDU frame format is disclosed; however, the wakeup negotiation frame is not limited to such frame structure.

The wakeup negotiation frame 900 may comprise category 910, wakeup negotiation 915, AP MAC address 920, target MAC address 930, and random number 940.

The AP MAC address 920 of the wakeup negotiation frame 900 may include the MAC address of an AP itself. The target MAC address 930 may include the MAC address of a target STA which acts as a receiver of data supposed to be transmitted by the AP itself.

The random number field 940 may include a value chosen randomly from the positive integer set ranging from 0 to 255, which is used as information for determining transmission priority. The random number field 940 is an example for expressing information for determining transmission priority; other field information may also be used for determining transmission priority and these embodiments also belong to the technical scope of the present invention.

According to an embodiment of the present invention, the wakeup negotiation frame generated may be broadcast to other APs. If an AP, which has received the broadcast wakeup negotiation frame, also has buffered data to be transmitted to an STA having the same target MAC address, the AP can also broadcast a wakeup negotiation frame. When the target MAC address included in the wakeup negotiation frame received from the AP is different, negotiation between APs based on RN values may not be carried out separately.

If a plurality of APs has buffered data to be transmitted to the same STA, the APs may operate according to a predefined rule that an AP having a smaller RN value included in the wakeup negotiation frame has priority to transmit a wakeup frame to the STA over other APs with larger RN values.

According to an embodiment of the present invention, at the time of transmitting a wakeup frame to an STA, a negotiation result between a plurality of APs may be included in the wakeup frame and transmitted.

Figure 10:
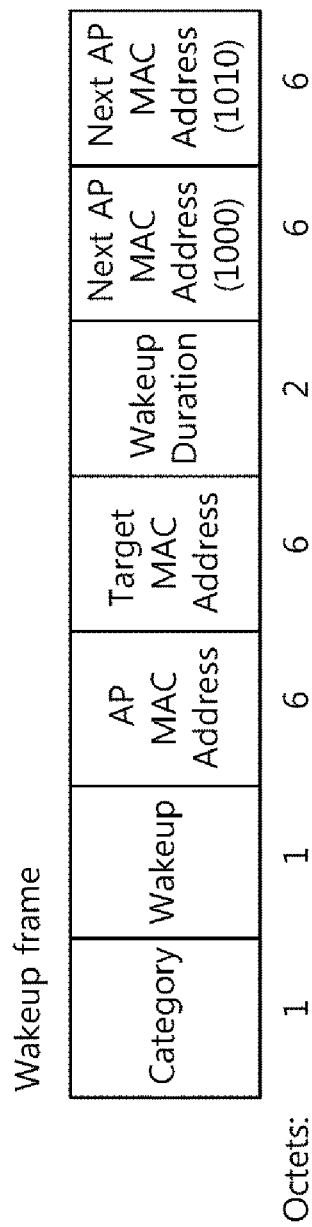
FIG. 10 illustrates a wakeup frame according to an embodiment of the present invention.

FIG. 10 illustrates a wakeup frame according to an embodiment of the present invention.

With reference to FIG. 10, in addition to the framebody of a wakeup frame described earlier in FIG. 6, Next AP MAC address 1000, 1010 may be additionally included and transmitted. The Next AP MAC address 1000, 1010 may include address information of an AP supposed to transmit the next wakeup frame to an STA after transmission of a wakeup frame to the STA.

As described above, before transmitting a wakeup frame to an STA, APs may exchange wakeup negotiation frames for determining transmission priorities. By exchanging wakeup negotiation frames beforehand, an AP can know the priority information of the other APs. Therefore, if a particular AP carries out transmission to an STA, the address information of an AP in the next priority may be included in a wakeup frame and transmitted to the STA.

For example, first of all, an AP having the smallest RN value (namely, the highest priority) can first transmit a wakeup frame to an STA. At this time, as the AP transmits a wakeup frame in the form including the Next AP MAC address 1000, 1010 to the STA, the STA can obtain the information about which AP has data to be received by the STA after the current AP. The STA, based on the information included in the Next AP MAC address 1000, 1010, can transmit again a paging frame to the AP having the Next AP MAC address 1000, 1010 instead of switching to the sleep mode at the end of wakeup duration.

In other words, the STA, instead of switching to the sleep mode, receives a wakeup frame response from the other AP by using the Next AP MAC address 1000, 1010 and carries out data transmission and reception continuously. The AP allowed to transmit a wakeup frame in the second place can transmit a wakeup frame by deleting the Next AP MAC address containing the MAC address of an AP which has completed transmission and reception. Therefore, the Next AP MAC addresses including information of only those APs having data to be transmitted to the remaining STAs can be transmitted to the paging STA.

According to an embodiment of the present invention, supported can be a case where STAs in the sleep mode are not associated with peripheral APs beforehand. In other words, as an STA broadcasts a paging frame, peripheral APs or other STAs capable of receiving the paging frame can transmit a wakeup frame and afterwards, association may be established and data communication may be allowed depending on the needs. For example, if firmware upgrade is needed for a particular STA, in response to the broadcast of a paging frame of the STA, the particular STA is made to enter into the awake mode and firmware upgrade can be carried out through an AP close to the STA and capable of transmitting firmware.

Also, according to an embodiment of the present invention, in addition to a method of AP's preventing collision which may occur during the simultaneous transmission of wakeup frames by exchanging wakeup negotiation frames beforehand, also possible is a method of operating transmission of a wakeup frame itself according to a CSMA/CS method for which applied is random backoff within a short contention window region agreed with each other. Also, the two methods can also be employed at the same time.

Figure 11:
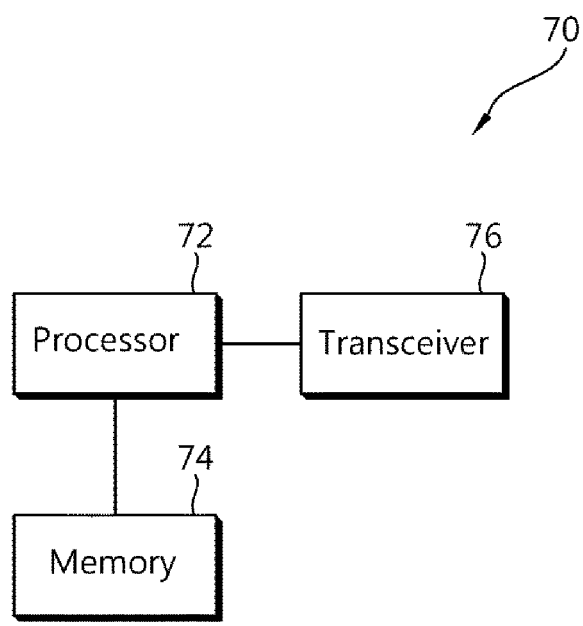
FIG. 11 illustrates a block diagram of a radio device to which embodiments of the present invention can be applied.

FIG. 11 illustrates a block diagram of a radio device to which embodiments of the present invention can be applied.

The radio device 70 is a terminal for which embodiments described above can be implemented, which may correspond to an AP or a non-AP station.

The radio device 70 comprises a processor 72, memory 74, and a transceiver 76. The transceiver 76 transmits and receives radio signals, where the physical layer of the IEEE 802.11 is implemented. The processor 72, being connected functionally to the transceiver 76, implements the MAC layer and the physical layer of the IEEE 802.11. The processor 72 can generate at least one of a paging frame, a wakeup frame, and a wakeup negotiation frame according to an embodiment of the present invention; and each frame can include information described in the embodiments of the present invention described above. The processor 72 may be so configured that embodiments of the present invention described above are implemented therein.

The processor 72 and/or a transceiver 76 may include ASIC (Application Specific Integrated Circuit), other chipsets, a logic circuits and/or a data processing device. The memory 74 may include ROM (Read-Only Memory), RAM (Random Access Memory), flash memory, memory card, storage medium and/or other storage devices. If embodiments are implemented by software, the methods described above may be implemented in the form of module (process, function, etc.) carrying out the functions described above. Modules may be stored in the memory 74 and carried out by the processor 72. The memory 74 may be installed inside or outside of the processor 72; and connected to the processor 72 through various well-known means.

The invention claimed is:

1. A method for associating with an access point in a wireless local area network, the method comprising:
   transmitting, by a station, a request frame to an access point (AP), the request frame including a physical layer header without a data field;
   determining, by the station, whether a response frame in response to the request frame is received from the AP before a waiting time expires; and
   if the response frame is received, transmitting, by the station to the AP, an association request frame to request an association with the AP,
   wherein the physical layer header includes a short training field, a long training field and a signal field, the signal field including frame type information and a cyclic redundancy check (CRC) for the signal field, and
   wherein the frame type information indicates the request frame includes no data field.

2. The method of claim 1,
   wherein the signal field further includes an identifier of the AP, and
   wherein the response frame has a signal field that includes the identifier.

3. The method of claim 2, wherein the the AP determines whether to transmit the response frame based on whether the identifier in the request frame matches the AP.

4. The method of claim 3, wherein the identifier is in a compressed format for a full identifier of the STA.

5. The method of claim 1, wherein the response frame is broadcast by the AP.

6. A device configured for associating with an access point in a wireless local area network, the device comprising:
- a transceiver that receives and transmits radio signals; and
- a processor, operatively coupled with the transceiver, that:
  - instructs the transceiver to transmit a request frame to an access point (AP), the request frame including a physical layer header without a data field,
  - determines whether a response frame in response to the request frame is received from the AP before a waiting time expires, and
  - instructs the transceiver to transmit an association request frame to request an association with the AP if the response frame is received,
- wherein the physical layer header includes a short training field, a long training field and a signal field, the signal field including an indication bit and a cyclic redundancy check (CRC) for the signal field, and
- wherein the indication bit indicates that the request frame has no data field.

7. The device of claim 6,
- wherein the signal field further includes an identifier of the AP, and
- wherein the response frame has a signal field that includes the identifier.

8. The device of claim 7,
- wherein the AP determines whether to transmit the response frame
- based on whether the identifier in the request frame matches the AP.

9. The device of claim 8, wherein the identifier is in a compressed format for a full identifier of the STA.

* * * * *